Figure 1:
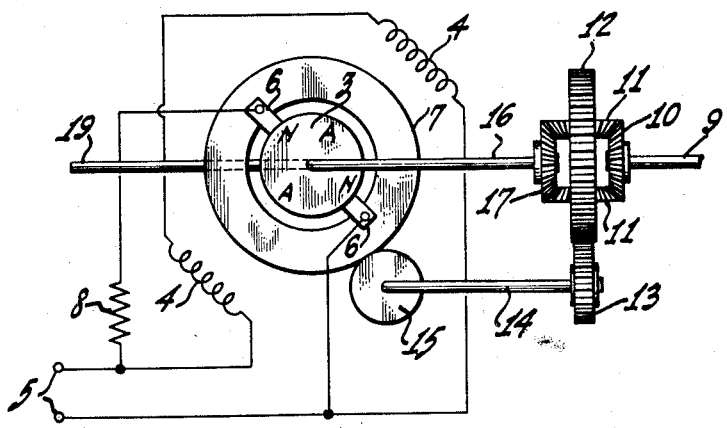

Oct. 11, 1949.  E. H. ROBINSON  2,484,120

ELECTRICAL FOLLOW-UP MOTOR CONTROL APPARATUS

Filed Sept. 11, 1946

INVENTOR.
Edward Howard Robinson
BY
ATTORNEY

Patented Oct. 11, 1949

2,484,120

UNITED STATES PATENT OFFICE 2,484,120

ELECTRICAL FOLLOW-UP MOTOR CONTROL APPARATUS

Edward Howard Robinson, Hillingdon, England, assignor to Electric and Musical Industries Limited, Hayes, England, a company of Great Britain Application September 11, 1946, Serial No. 696,133
In Great Britain August 8, 1944

Section 1, Public Law 690, August 8, 1946
Patent expires August 8, 1964

3 Claims. (Cl. 318—32)

This invention relates to electrical control apparatus.

For many purposes, such as for controlling the direction of radio aerials or for controlling the movement of gun mountings it is necessary to provide an electrical control apparatus in which the member to be moved is driven by an electric motor under the control of a small force which may be imparted mechanically or manually. For example, in gun mountings it may be desired to control the bearing of the gun by manual rotation of a shaft to a predetermined extent and to cause such movement to control an electric motor so that the gun mounting is moved by the motor to an extent proportional to the manual manipulation of the shaft. The present invention is applicable to control apparatus for such a purpose and for any other purpose where, in effect, an amplification of torque is required.

It is well known that in D. C. electric motors angular movement of the brushes about the axis of the commutator controls the direction of rotation and the torque developed by the motor. There is, however, a neutral position at which the torque is zero and the armature is stationary. If the brushes are displaced to one side of the neutral position the armature will commence to rotate in one direction and if the brushes are displaced to the other side of the neutral position the armature will rotate in the opposite direction. As the brushes are displaced further away from the neutral position the torque developed by the motor increases until it reaches a maximum, this maximum in the case of a simple two-pole machine being approximately 90° from the neutral position. It will be appreciated that the torque necessary to cause angular movement of the brushes is only substantially that required to overcome their frictional contact with the commutator, whereas the torque developed by the motor may greatly exceed the torque required to cause angular movement of the brushes and hence an amplification of torque can be obtained. This principle is employed in the control apparatus according to the present invention.

According to the invention therefore electrical control apparatus is provided comprising a D. C. electric motor, means for causing angular displacement of the brushes of said motor from their neutral position to cause the armature of said motor to rotate, said armature being coupled to said brushes in such a manner that rotation of the armature causes said brushes to be moved back to their neutral position. For example, a control shaft may be provided which can be rotated manually or mechanically said control shaft being coupled through a differential gear to the brushes of the motor so that on rotating said control shaft the brushes are angularly moved to a proportional extent. When the brushes are moved from their neutral position the armature commences to rotate and develops a torque depending on the characteristics of the motor. The armature may also be coupled to the differential gear and the sense of the gearing be so arranged that rotation of the armature serves to restore the brushes of the motor to their neutral position.

There is a possibility with control apparatus according to the invention that the brushes of the motor will tend to hunt when they are angularly moved by the armature of the motor. A feature of the present invention comprises the provision of a suitable damping means for the purpose of overcoming or reducing this possibility.

Figure 2:
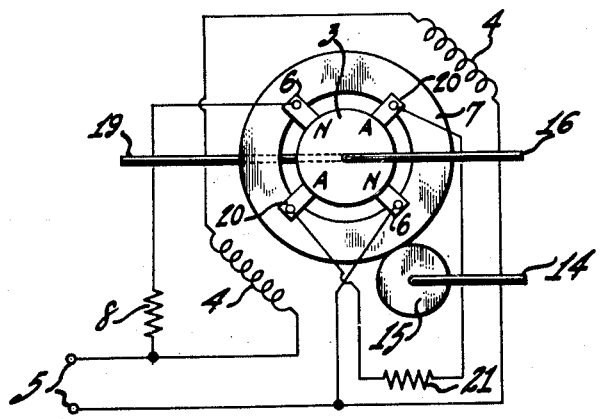

In order that the said invention may be clearly understood and readily carried into effect it will now be more fully described with reference to the accompanying drawings, in which Figure 1 illustrates diagrammatically control apparatus according to the invention, and Figure 2 illustrates a part of the apparatus shown in Figure 1 provided with damping means in accordance with a feature of the invention.

Referring now to Figure 1 of the drawings, the reference numeral 3 indicates the commutator of the armature of a simple two-pole D. C. electric motor the field windings 4 of which are connected in series with the D. C. supply terminals 5. It will, of course, be appreciated that the invention is not limited to two-pole motors. The brushes 6 of the motor are supported on a carrier 7 in the form of a gear wheel, current being supplied to the brushes from the D. C. supply through a series resistance 8 which serves to limit the armature current to a safe value whilst the motor armature is stationary, it being assumed that, in operation, the motor is permanently connected to the D. C. supply. It is assumed in Figure 1 that the disposition of the brushes 6 corresponds to their neutral position, that is to say, a position in which although the motor is connected to the source of supply the armature is stationary, the position of the brushes at which maximum torque is developed by the motor being 90° from the position shown. Rotation of the brush carrier 7 and therefore of the brushes is effected from a control shaft 9 through a differential gear comprising a bevel pinion 10 attached to the end of the shaft 9 which meshes with two or more planetary pinions 11 carried by a cage 12, the cage 12 meshing with a pinion 13 on one end of a shaft 14, the other end of which carries a further pinion 15 which meshes with the brush carrier 7. Thus, on rotating the shaft 9 in one direction or the other a proportional movement is imparted through the differential gear to the brush carrier 7 so as to cause the brushes 6 of the motor to be angularly moved from their neutral position, the direction and extent of movement of the brushes 6 depending on the direction and extent of movement of the shaft 9 and determining the direction of rotation of the armature of the motor and the torque developed thereby. The torque developed by the motor will naturally depend on the characteristics of the motor and it will be appreciated therefore that substantially any desired degree of torque amplification can be obtained by suitable design of the motor. The armature of the motor is coupled back to the differential gear through a shaft 16 which carries a further bevel pinion 17 which meshes with the pinions 11. The arrangement is such that rotation of the armature of the motor serves through the differential gear to cause angular movement of the brushes back to their neutral position. Thus manual rotation of the shaft 9 to an extent desired serves to produce a required torque amplification, the torque developed by the motor being delivered to the mechanism required to be controlled by the armature shaft, such torque being proportional to the movement of the shaft 9. Rotational movement of the armature returns the brushes 6 through the differential gear back to their neutral positions so that the motor is brought to rest as soon as the required movement is completed.

In order to avoid the possibility of the brushes 6 of the arrangement shown in Figure 1 tending to hunt when they are returned to their neutral position by the motor, the damping means shown in Figure 2 may be employed, such damping means comprising a pair of auxiliary brushes 20 mounted on the carrier 7 and displaced by 90° from the main brushes 6. The brushes 20 are connected together either directly or through a series resistance 21 according to the degree of damping required. It will be appreciated that due to the generator action of the D. C. motor, for any given angular velocity of the armature a maximum E. M. F. will be developed at the brushes 20 when the main brushes 6 are in their neutral position. As the brushes 20 are connected together through a low resistance a current will flow through the armature windings in such a sense as to produce an opposing torque to the rotation of the armature thus serving to damp rotation of the armature due to its inertia. It will be appreciated that as the brush carrier 7 is rotated under the control of the control shaft 9, the auxiliary brushes 20 will also be moved with the main brushes 6 from the position shown so that the damping force due to the brushes 20 is gradually reduced until the brushes 20 reach the position shown as occupied by the brushes 6, when maximum torque of the motor is developed and substantially no generated E. M. F. appears across the brushes 20 so that in this position the damping effect is a minimum.

It will be appreciated from the above that the invention provides a simple mechanism whereby substantially any desired degree of torque amplification can be obtained. The control shaft 9 may be manually rotated or rotated by a controlled mechanical or electrical means, the control apparatus described being suitable for any purpose where large torques are required from a small input control torque.

What I claim is:

1. In an electrical control apparatus comprising a D. C. motor having a commutator and a pair of brushes mounted for rotation about said commutator, input means for causing angular displacement of said brushes from a neutral position to cause rotation of said armature, and coupling means between said armature and said brushes for returning said brushes to said neutral position to thereby stop the rotation of said armature, two auxiliary brushes mounted for angular rotation with said first-mentioned pair of brushes, and angularly displaced therefrom, and means interconnecting said auxiliary brushes, whereby rotation of said armature produces a current in the armature windings which causes a torque opposing rotation of said armature.

2. In an electrical control apparatus comprising a D. C. motor having a commutator and a pair of brushes mounted for rotation about said commutator, input means for causing angular displacement of said brushes from a neutral position to cause rotation of said armature, and coupling means between said armature and said brushes for returning said brushes to said neutral position to thereby stop the rotation of said armature, two auxiliary brushes mounted for angular rotation with said first-mentioned pair of brushes, and angularly displaced therefrom, and a direct current connection between said auxiliary brushes, whereby rotation of said armature produces a current in the armature windings which causes a damping torque.

3. The control apparatus claimed in claim 2, said direct current connection including a resistor.

EDWARD HOWARD ROBINSON.

REFERENCES CITED

The following references are of record in the file of this patent:

UNITED STATES PATENTS

| Number | Name | Date |
| --- | --- | --- |
| 1,068,759 | Girardelli | July 29, 1913 |
| 1,672,677 | Ellis | June 5, 1928 |
| 1,708,541 | House | Apr. 9, 1929 |
| 1,883,711 | Granat | Oct. 18, 1932 |